United States Patent
Morisette et al.

(10) Patent No.: US 6,454,972 B1
(45) Date of Patent: Sep. 24, 2002

(54) SOLID FREEFORM FABRICATION USING CHEMICALLY REACTIVE SUSPENSIONS

(75) Inventors: Sherry L. Morisette, Belmont, MA (US); Joseph Cesarano, III, Albuquerque, NM (US); Jennifer A. Lewis, Urbana, IL (US); Duane B. Dimos, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/721,835

(22) Filed: Nov. 22, 2000

Related U.S. Application Data (60) Provisional application No. 60/167,403, filed on Nov. 24, 1999.

(51) Int. Cl.[7] .................................................. B28B 7/04
(52) U.S. Cl. .......................... 264/39; 264/236; 264/240; 264/299
(58) Field of Search ................................. 264/234, 236, 264/240, 299, 497, 39

(56) References Cited

U.S. PATENT DOCUMENTS

| | | | |
|---|---|---|---|
| 3,366,498 A | | 1/1968 | Osborne |
| 5,227,104 A | * | 7/1993 | Bauer ........................... 51/309 |
| 5,348,566 A | | 9/1994 | Sawyer et al. |
| 5,510,066 A | | 4/1996 | Fink et al. |
| 5,514,321 A | * | 5/1996 | Cridge et al. ................ 264/240 |
| 5,617,911 A | | 4/1997 | Sterett et al. |
| 5,622,216 A | | 4/1997 | Brown |
| 5,697,043 A | | 12/1997 | Baskaran et al. |
| 6,027,326 A | | 2/2000 | Cesarano, III et al. |
| 6,132,396 A | * | 10/2000 | Antanavich et al. .......... 604/82 |

OTHER PUBLICATIONS

Elsevier, A Review of Rapid Prototyping Technologies and Systems, May 18, 1994 pp. 307–318.
King, Morissette, Denham, Cesarao & Dimos, Influence of Rheology on Deposition Behavior of Ceramic Pastes in Direct Fabrication Systems, Aug. 10, 1998.
Lewis, Colloidal Processing of Ceramics, Jan. 24, 2000, pp.
Morissette, & Lewis, Solid Freeform Fabrication of Aqueous Alumina–Poly (vinyl alcohol) Gelcasting Suspensions, Nov. 20, 1999, pp. 2409–2416.

* cited by examiner

Primary Examiner—Christopher A. Fiorilla
(74) Attorney, Agent, or Firm—George H. Libman (57) ABSTRACT

The effects of processing parameters and suspension chemorheology on the deposition behavior of SFF components derived from polymeric-based gelcasting suspensions combines the advantages associated with SFF fabrication, including the ability to spatially tailor composition and structure as well as reduced tooling costs, with the improved handling strength afforded by the use of gel based formulations. As-cast free-formed $Al_2O_3$ components exhibited uniform particle packing and had minimal macro-defects (e.g., slumping or stair casing) and no discernable micro-defects (e.g., bubbles or cracking).

10 Claims, 6 Drawing Sheets

SOLID FREEFORM FABRICATION USING CHEMICALLY REACTIVE SUSPENSIONS

CROSS REFERENCE TO RELATED APPLICATIONS

This application claims the benefit of Provisional Appl. S. No. 60/167403, filed Nov. 24, 1999.

The United States Government has rights in this invention pursuant to Department of Energy Contract No. DE-AC04-94AL85000 with Sandia Corporation.

BACKGROUND OF THE INVENTION

The continual drive towards agile, facile methods for producing near-net shape advanced ceramic components has led to a revolutionary class of forming techniques known as solid freeform fabrication (SFF). Such techniques utilize computer-controlled robotics to build three-dimensional components in a layer-by-layer fashion. To date, several SFF techniques, including stereolithography (SLA), fused deposition of ceramics (FDC), laminated object manufacturing (LOM), computer-aided manufacturing of laminated engineering materials (CAM-LEM), 3D printing (3DP™), and robocasting, have been developed. However, many of these approaches rely on feedstocks that contain 40–70 vol % organic species, which give rise to debinding problems and limit component sizes to ~2 cm thickness or less.

Robocasting is a slurry deposition technique described in U.S. Pat. No. 6,027,326 of J. Cesarano et al. It is capable of producing large-scale, near-net shape components that utilizes feedstock of negligible organic content (<1 vol %). In this approach, pseudoplastic ceramic suspensions ($\phi_{solids}$ >0.50) are deposited onto a substrate in a precise pattern. Upon minimal drying, the as-deposited suspension undergoes a liquid-to-solid transition that freezes in the structure of the patterned element. Current challenges to this approach involve controlling the macroscopic shape evolution of the as-deposited components. Both slumping, which results from insufficient drying in high aspect ratio multi-layer components, and considerable stair-casing in component walls have been observed. Hence, there is a need to develop new feedstock materials with low organic content, such as gelcasting suspensions, to improve the mechanical strength of the deposited layers and thereby overcome these limitations.

Gelation denotes the transition from a liquid (sol) to a solid (gel) state that occurs in the absence of fluid removal. During this process, discrete species in solution undergo growth (e.g., monomers→network polymers; colloidal particles→aggregated network; or linear polymers→network polymers) as gelation proceeds. Such species grow until at least one cluster, known as a percolating (or spanning) cluster, reaches a critical size on the order of the sample dimensions, signifying the formation of a gel. At sol-gel transition, dramatic changes in the viscoelastic properties of the system are observed, as described by H. Winter, "Polymeric Gels, Materials that Combine Liquid and Solid Properties," *MRS Bull.*, 16 [8] 44–48 (1991). The viscosity of the system increases with time before its divergence to infinity at the gel point, which coincides with the formation of a 3-D space-filling cluster whose characteristic size is on the order of the sample dimensions. If growth is arrested because of the depletion of reactant before gel formation, the system remains in the liquid state, and its apparent viscosity plateaus to a steady-state value. Beyond the gel point, additional linkages form between growing clusters, thereby strengthening the gel network.

A. Fanelli et al., U.S. Pat. No. 4,734,237, Process For Injection Molding Ceramic Composition Employing An Agaroid Gell-Forming Material To Add Green Strength To A Preform, discloses the steps of forming a mixture comprising metal and/or ceramic powders, a gel-forming material having a gel strength, measured at a temperature between 0° C. and about 22° C. and a gel consisting essentially of about 4 wt. % of the gel-forming material and water, of at least about 100 g/cm2, and a gel-forming material solvent, and molding the mixture at a temperature sufficient to produce a self-supporting article comprising the powder and a gel. Unlike conventional injection molding, this process uses relatively low (~10 vol % or less) binder content.

Gelcasting is a bulk fabrication technique for producing near-net shape ceramic components. M. Tanney, U.S. Pat. No. 4,894,194, Method For Molding Ceramic Powders, discloses forming a slurry mixture including ceramic powder, a dispersant for the metal-containing powder, and a monomer solution. The monomer solution includes at least one multifunctional monomer, a free-radical initiator, and an organic solvent. The slurry mixture is transferred to a mold, and the mold containing the slurry mixture is heated to polymerize and crosslink the monomer and form a firm polymer-solvent gel matrix. The solid product may be removed from the mold and heated to first remove the solvent and subsequently remove the polymer, whereafter the product may be sintered.

M. Tanny, U.S. Pat. No. 6,066,279, Gelcasting Methods, provides a solution of HMAM and water. At least one inorganic powder is added to the mixture and an initator system is provided to polymerize the HMAM to form a hydrogel. This system also forms the gel in situ.

It is readily apparent that in situ gelation is not suitable for SFF, as such techniques require a form to maintain the shape of the article until it hardens.

S. Morissette and J. A. Lewis investigated aqueous, alumina-poly(vinyl alcohol) gelcasting suspensions. They found that the addition of particles shifted the sol-gel phase transition to increasingly lower critical cross-linking concentrations, suggesting that solid filler was not inert. They investigated the chemorheological properties of these suspensions and found that the gelation behavior can be tailored by varying the suspension composition (i.e., solids volume fraction, PVA content, and cross-linking agent concentration), as well as the processing temperature. They concluded that polymer-based gelcasting systems are a viable alternative to in situ polymerization of monomeric systems. Also, the strong temperature dependence of the gelation kinetics allows one to handle such systems at low temperature (where gelling is slowed) prior to casting. In addition, they determined that the gel strength can be tailored by exploiting the dependence on cross-link concentration as well as the solids volume fraction dependence, as indicated in their paper, *Chemorheology of Aqueous-Based Alumina-Poly(vinyl) alcohol) Gelcasting Suspensions*, J. Am. Ceram. Soc. 82 (3) 521–28 (March 1999), which paper is incorporated herein by reference.

SUMMARY OF THE INVENTION

It is an object of this invention to provide solid freeform fabrication using a computer-controlled extrusion apparatus where as-cast SFF-derived components exhibit uniform particle packing comparable to bulk gelcast components with minimal macro-defects (e.g., slumping or stair casing) and no detectable micro-defects (e.g., bubbles or cracking).

It is also an object of this invention to use gel-casting suspensions as feedstock material in a SSF system to tailor deposition behavior, and hence, component properties of SFF-derived, advanced ceramic components.

These and other objects of the invention may be attained by a method for freeform fabrication of objects comprising providing a first fluid in a first container, providing a second fluid in a second container; feeding the first and second fluids to a mixing chamber; mixing the first and second fluids in the mixing chamber to form a third fluid; and forming an object by depositing a bead of the third fluid from the mixing chamber onto a platform that moves relative to the mixing chamber, the third fluid gelling shortly after being deposited.

BRIEF DESCRIPTION OF THE DRAWINGS

The accompanying drawings, which are incorporated in and form part of the specification, illustrate an embodiment of the present invention and, together with the description, serve to explain the principles of the invention.

FIGS. 1b and 1c show details of the apparatus of FIG. 1a.

DETAILED DESCRIPTION OF THE INVENTION

Figure 1A:
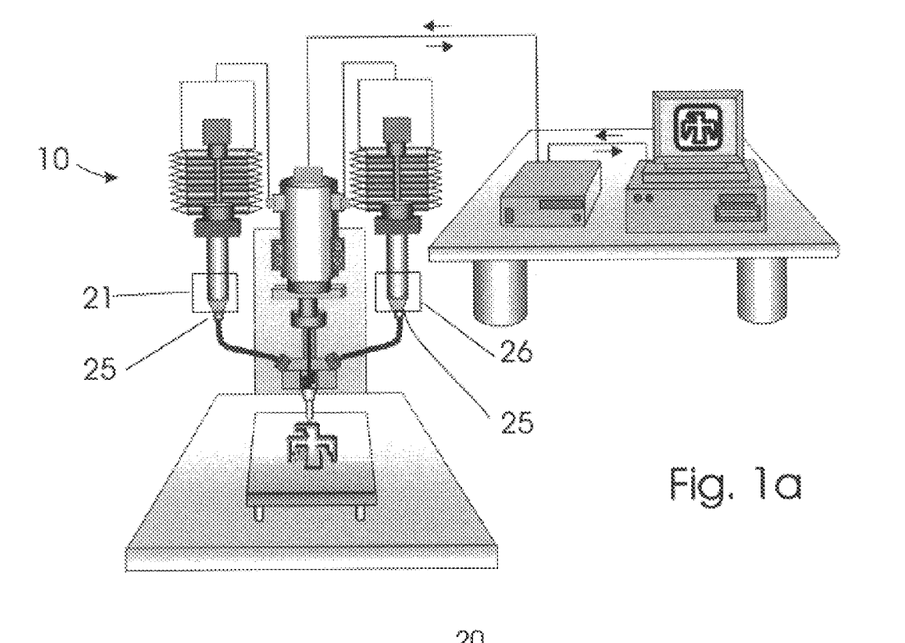
FIG. 1a shows the robocasting apparatus.
Figure 1B:
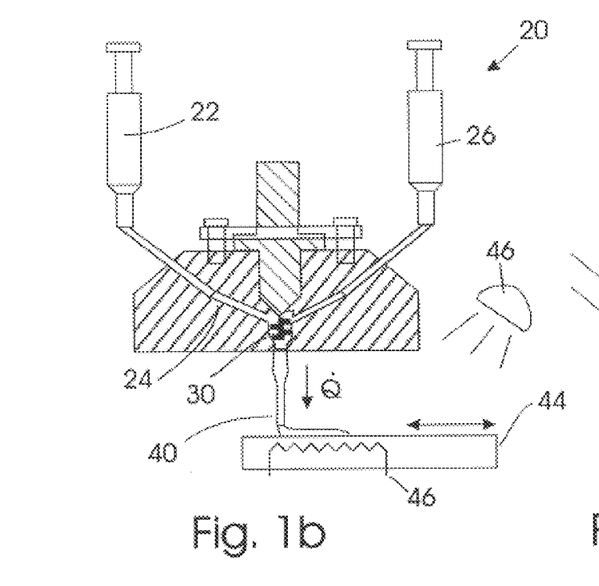

In accordance with this invention, solid freeform fabrication is carried out using a computer-controlled extrusion apparatus 10 as shown in FIG. 1a including a two-nozzle delivery system 20 shown in FIG. 1b. One nozzle 24 carries a first fluid such as a partially-polymerized suspension from 30 ml polyethylene syringe 22; the other nozzle 28 carries a second fluid such as a cross-linking agent from a similar syringe 26. The important properties of the first and second fluids are that they are fluid in the separate states, and they rapidly harden after being mixed. Each syringe is fitted with a conventional cooling device 25 such as coil 25 for cooling the syringes to about 15° C.

Figure 1C:
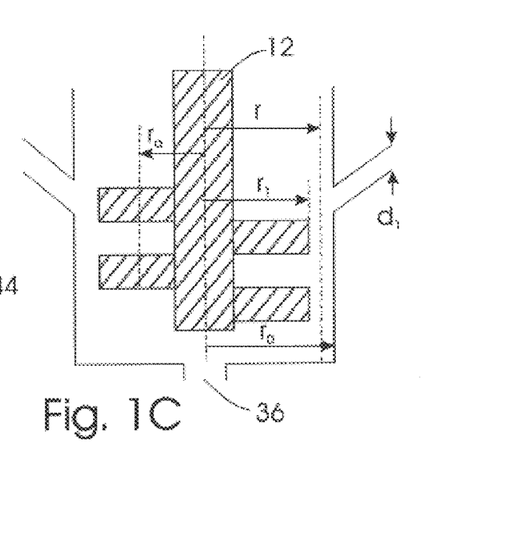

As shown in FIG. 1c, output from each of nozzles 24, 28 meet at cylindrical mixing chamber 30 where the contents are homogenized by a rotating paddle mixer 32 to form a third fluid. In the preferred embodiment, chamber 30 is quite small, with a radius $r_0 \approx 3.4$ mm and a length of about 5 mm. The pressure from syringes 22, 26 causes the third fluid to be extruded from an output 36 at the end of mixing chamber 30 through tip 40 where it is deposited on a table 44 that moves relative to tip 40 in a precise pattern via computer-aided design (CAD) instruction. The cooled first and second fluids inhibit gelation in mixing chamber 30, which may also be cooled by in the same manner as syringes 22, 26. The temperature of table 44 is preferably raised by either heating devices under the surface such as a resistive coil 46 or by radiant energy applied to the surface in a conventional manner, such as by lamp 48 to facilitate gelation of the deposited mixture. By suitable movement of table 44 relative to tip 40, single or multilayer structures may be deposited onto table 44 in a manner well known in the art.

Materials System

In accordance with a preferred embodiment of the invention, $Al_2O_3$ powder with a specific surface area of 8.0 m$^2$/g as determined via BET analysis and a mean particle size of 0.4 μm as determined by particle size analysis served as the ceramic phase. Darvan® C (R.T. Vanderbilt Co.), a 25 wt % aqueous solution of ammonium poly(methacrylate) (APMA), was used as the dispersant. Partially hydrolyzed PVA with a degree of hydrolysis of 80.8 mole percent and an average molecular weight of 28,700 g/mol was utilized as the polymeric additive. Tyzor TE was selected as the cross-linking agent because it has been shown to react with PVA to form a gel under appropriate conditions. Tyzor TE® (E.I. DuPont de Nemours and Co.), triethanolamine titanate chelate contains 8.3% titanium (Ti) by weight, as confirmed via thermogravimetric analysis, and consists of a 25 wt % solution (in isopropyl alcohol) of various organotitanate chelates. The proposed cross-linking reaction sequence had been discussed in the aforementioned Morissette paper. A short chain alcohol, 1-octanol, was utilized as a defoamer in this work to minimize microdefects associated with bubble formation.

Suspension Preparation

For the preferred embodiment, the fluid for syringe 22 was one of a plurality of feedstock suspensions prepared by adding an appropriate amount of $Al_2O_3$ powder to an aqueous solution containing 0.012 g Darvan C/g $Al_2O_3$. Each suspension was ultrasonicated at one second pulsed intervals for 150 seconds, and subsequently magnetically stirred for 12 hours to allow dispersant adsorption onto $Al_2O_3$ powder surfaces. An appropriate amount of PVA stock solution, prepared by dissolving PVA in deionized water under ambient conditions, was added to the suspensions, and the pH of each suspension was adjusted to 8.5±0.1 using $HNO_3$ or $NH_4OH$. Suspensions were defoamed by addition of 0.25% 1-octanol by volume of solution and mixed for 2 hours using a slow roll mill prior to casting. Note, these suspension were prepared with a reduced solvent content to account for the volume of cross-linking agent to be added, such that the effective solids volume fractions ($\phi_{Al_2O_3}^{eff}$) ranged from 0.45–0.468, corresponding to cross-linking agent concentrations of 0–6.30× $10^{-3}$ g Ti/ml solution. The concentration was used for comparative purposes and showed that cross-linking agent was necessary in this application.

Component Fabrication

For comparison purposes, ceramic components were bulk cast and free-formed using a slurry deposition technique. Bulk samples were prepared by separately equilibrating the suspension and cross-linking agent at 5.0±0.1° C. in their respective, cooled, syringes, then adding an appropriate amount of the organotitanate cross-linking agent to the suspension in mixing chamber 30, homogenizing the components in chamber 30, and pouring the mixture into polyethylene molds coated with a non-silicone release agent. Samples were gelled in situ, removed from the molds, and dried in a series of controlled humidity chambers.

Free-formed components were cast using the computer-controlled extrusion apparatus 10 fitted with a two-nozzle delivery system, as illustrated in FIG. 1. The ceramic suspension and cross-linking agent (Tyzor TE) were loaded into separate syringes 22 and 26. The syringes were clamped into the SFF apparatus housings, each of which was fitted with a cooling coil 25 that chilled the gelcasting components to 15.0±0.02° C. in order to minimize gelation in mixing chamber 30. Three-dimensional components (1.0×1.0×0.5 cm³) were constructed using a layer-by-layer build sequence. The X-Y table was heated to 30.0±1.0° C. using resistance heaters to enhance gelation kinetics in the deposited layers.

Single line prints and 3-D components were cast under different conditions, including: (1) cross-linking concentrations of [Ti]=0.0, 3.04×10$^{-3}$, and 6.30×10$^{-3}$ g Ti/ml in solution, (2) mixing rates ($R_{mix}$) of 0–300 rpm, and (3) tip diameters ($d_t$) of 0.254–1.37 mm. The printability of the system was determined by depositing a single line in a serpentine pattern. If this pattern could be printed continuously for at least 10 minutes, then the system was defined as printable. Samples were dried either in air under ambient conditions or in a controlled humidity environment.

Component Properties

The effects of processing parameters on the properties SFF derived components were evaluated using a variety of techniques. Line and layer thickness uniformity of dried as-cast bodies was characterized using scanning laser profilometry and optical microscopy. The density of as-cast components was measured via geometrical methods. Scanning electron microscopy (SEM) was used to analyze component microstructure, including defect/void population and particle packing.

Results and Discussion

Modeling of Flow Behavior During SFF Fabrication

The free-forming process generates different shear environments depending on the stage of the deposition sequence. This sequence can be divided into four zones, each of which are defined by a characteristic shear rate ($\dot{\gamma}$) regime, as illustrated in FIG. 1(b), including pumping from the syringe 22 ($\dot{\gamma}_p$), mixing via the paddle mixer 30 ($\dot{\gamma}_{mix}$), extrusion from the output 36 ($\dot{\gamma}_{ext}$), and deposition onto the moving X-Y table 44 ($\dot{\gamma}_{dep}$). The shear rate ranges for each of these zones was estimated in order to identify the boundary shear rate conditions for varying process conditions. These shear rate ranges were used to correlate the effects of processing parameters on the Theological properties, and hence deposition behavior, of the casting suspensions during free-forming. The methods used to estimate the shear rate ranges associated with each zone are outlined below:

Zone 1: Syringe Transfer

The syringe plunger acts as a piston that forces the suspension from the syringe into the mixing chamber. Flow of the suspension is most restricted at the mixing chamber inlet, which has a diameter of 1.52 mm. A gradient in the shear rate profile is expected for flow through this cylindrical channel, where the maximum shear rate, ($\dot{\gamma}_{max}$) occurs near the vessel wall and is given $$\dot{\gamma}_{max} = \frac{4\dot{Q}}{\pi R^3},$$

where $\dot{Q}$=volume flow rate, and R=radius of the inlet channel. Thus, the maximum shear rate ($\dot{\gamma}_{max}$) varies directly with the volume flow rate ($\dot{Q}$) according to $\dot{\gamma}_{max}$=2.9$\dot{Q}$. The inlet volume flow ($\dot{Q}$) depends on the table speed ($s_t$), tip diameter ($d_t$), and layer thickness ($t_l$) as given by $\dot{Q}=s_t d_t t_l$. For typical inlet volume flow rates up to 0.02 ml/s, the maximum shear rate at the inlet wall ranges from 0 to 60 s$^{-1}$.

Zone 2: Mixing Chamber

The mixing apparatus, which consisted of a double-edged comb shaped paddle and a cylindrical chamber, as illustrated in FIG. 1(c), was modeled using a coaxial cylinder approximation. The radius of the inner cylinder, i.e., the paddle, was varied from its maximum value of $r_l$=1.59 mm to an average value of $r_a$=0.89 mm (refer to FIG. 1(c)). The radius of the mixing chamber was $r_o$=1.72 mm. The mixing shear rate ($\dot{\gamma}_{mix}$) was evaluated at a constant radius, i.e., r=1.651 mm, according to $$\dot{\gamma}_{mix} = \frac{4\pi f r_1^2 r_o^2}{r^2 (r_o^2 - r_1^2)},$$

where f=frequency of rotation, $r_l$ is radius of the paddle, $r_o$ is radius of mixing chamber, and $$r = \frac{(r_1 + r_2)}{2}.$$

Figure 2:
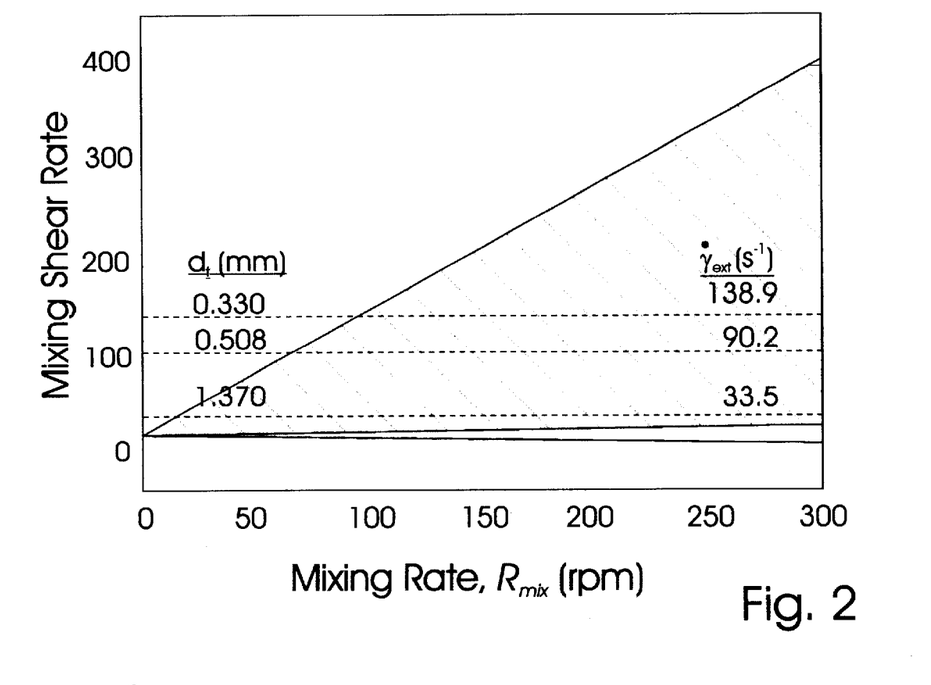
FIG. 2 shows mixing shear rate ($\dot{\gamma}_{mix}$) as a function of mixing rate ($R_{mix}$).

The mixing shear rate ($\dot{\gamma}_{mix}$) is plotted as a function of mixing rate ($R_{mix}$) for the maximum and average paddle radius in FIG. 2, where $\dot{\gamma}_{mix}$ for typical deposition conditions ranged from 10–400 s$^{-1}$.

Zone 3: Extrusion from Tip

Figure 3A:
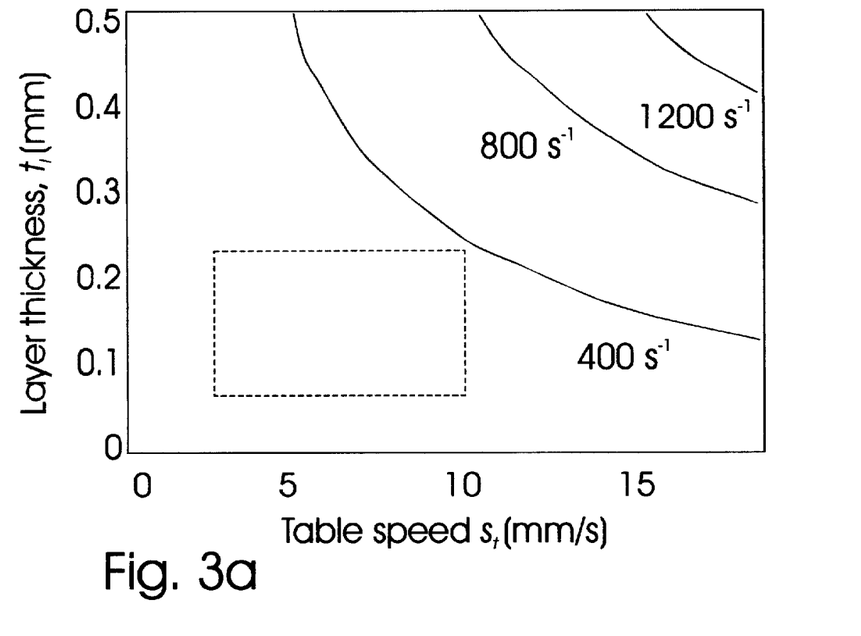
FIGS. 3a and 3b show contour plots of maximum shear rate ($\dot{\gamma}_{ext}$) as a function of table speed ($s_t$) and layer thickness ($t_l$).
Figure 3B:
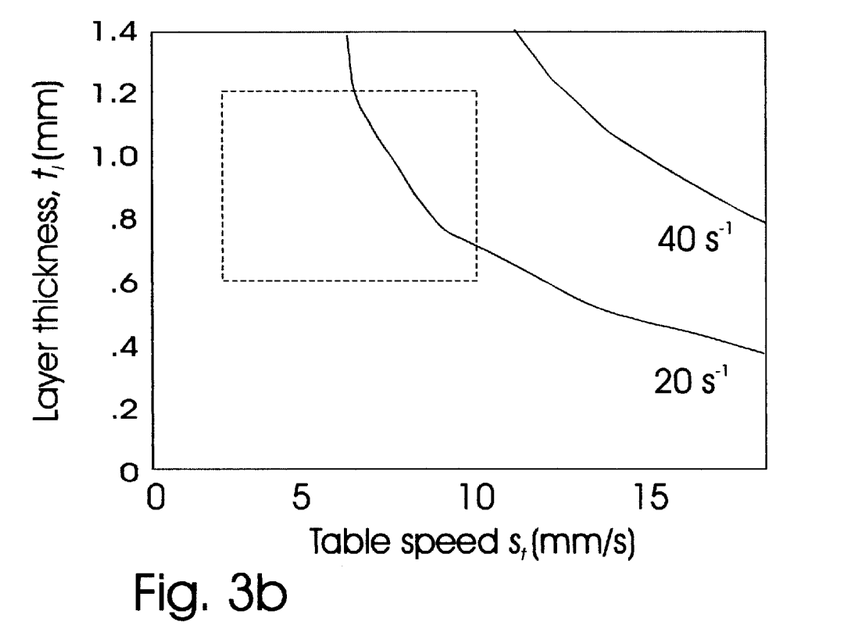

Extrusion of suspension from the tip induces shear behavior analogous to that calculated for flow through the mixing chamber inlet (Zone 1), where the maximum shear rate at the inlet walls is given by equation 1 for $\dot{Q}$=outlet volume flow rate, and R=radius of the deposition tip. The volume flow rate, $\dot{Q}=s_t d_t t_l$, was calculated for varying table speed ($s_t$) and layer thickness ($t_l$) for tip diameters ($d_t$) of 0.254 mm and 1.37 mm, the maximum and minimum tip diameters used, respectively. These data were complied into contour maps of maximum extrusion shear rate ($\dot{\gamma}_{ext}$) as a function of table speed ($s_t$) and layer thickness ($t_l$), as illustrated in FIGS. 3(a) and (b). Extrusion shear rates of 0.1–400 s$^{-1}$ are expected.

Zone 4: Deposition onto Moving Table

Patterning of the suspension onto the moving X-Y table results in shear stress at the suspension/table interface. The shear rate range at the contact interface was simulated using GOMA 2.0 for typical deposition conditions. GOMA is a full-Newton finite element program for analysis of manufacturing flows and related processes. (See P. R. Schunk et al., *GOMA 2.0-A Full-Newton Finite Element Program for Free and Moving Boundary Problems with Coupled Fluid/Solid Momentum, Energy, Mass, and Chemical Species Transport: User's Guide,* SAND97-2404, Sandia National Laboratories, Albuquerque, N Mex. (1997)). It uses a fullyimplicit, pseudo-solid, unstructured mesh deformation algorithm which allows all boundaries and interfaces to be treated as free (position unknown) or moving (position unknown or prescribed, but variable). For Newtonian fluids, an Arbitrary-Lagrangian-Eulerian (ALE) formulation allows the boundaries to respond to constraint equations or distinguishing conditions. These distinguishing conditions define the location of all boundaries and interfaces, providing the necessary mathematical closure of the system of equations governing the free boundary problem, i.e., the distinguishing conditions correlate the mesh deformation behavior and the physics of interest.

Figure 4A:
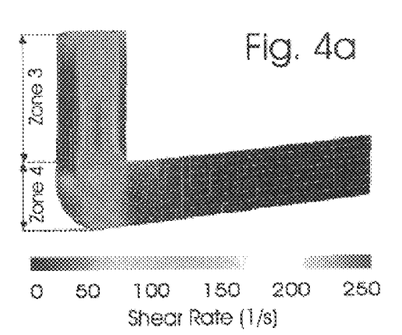
FIGS. 4a–4d show calculated shear rate ($\dot{\gamma}$) for varying conditions.
Figure 4B:
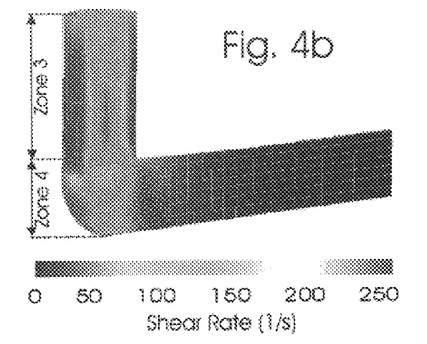

GOMA has been used to model numerous processes relevant to ceramics processing, including coating operations, axisymetric extrusion, simple mold filling and drying and shrinking of deformable porous media. Here, the deposition behavior of ceramic suspensions onto a moving substrate was modeled by solving the Navier-Stokes equation, given by:

$$\frac{\partial V}{\partial t} + (V \cdot \nabla)V = -\frac{1}{\rho}\nabla_p - \nabla_g + \nu\nabla^2 V,$$

where V is the velocity, σ is the density, $\nabla_p$ is the momentum gradient, $\nabla_g$ is the gravity gradient and V, is the vector operator del defined as $V(\ )=i\partial(\ )/\partial x+j\partial(\ )/\partial y+k\partial(\ )/\partial z$. This solution, however, is only applicable to Newtonian fluids. Therefore, simulations were run for upper and lower bounding apparent viscosities (i.e., 1 Pa·s and 100 Pa·s) in order to determine the significance of viscosity effects on the maximum shear rates attained. The results of these simulations are shown in FIGS. 4(a) and (b), where the calculated shear rates ($\dot{\gamma}$) for a tip diameter ($d_t$) of 0.254 mm at a table speed ($s_t$) of 5 mm/s, layer thickness of ($t_l$) 0.227 mm ($t_l$=0.9$d_t$) and a volume flow rate of $\dot{Q}$=0.00025 ml/s for suspensions with Newtonian viscosities of 1 Pa·s and 100 Pa·s, respectively. In both cases, maximum shear rates of 250 s$^{-1}$ occur at the initial contact interface between the suspension and table, where the shear rate falls rapidly to zero at short distances beyond this first contact interface. Note, the shear rates at the contact point are relatively high, however, the volume of suspension they influence is small. Thus, the impact of shear due to deposition (Zone 4) is likely negligible compared to the shear experienced during mixing (Zone 2) and extrusion from the tip (Zone 3). No observable differences in the shear rate profiles were found with varying suspension viscosity, suggesting the Navier-Stokes solution is satisfactory over the range of suspension viscosities utilized.

Figure 4C:
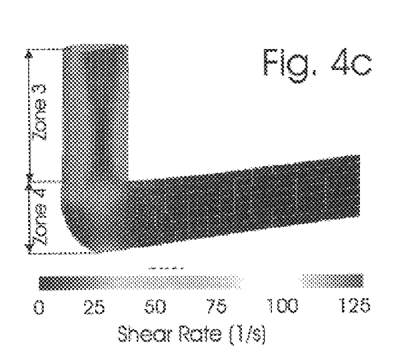

The influence of tip diameter ($d_t$) on the shear rate profile during deposition is shown in FIGS. 4(a) and (c) for tip diameters ($d_t$) of 0.254 mm and 1.370 mm at constant table speed ($s_t$=5 mm/s), layer thickness ($t_l$=0.227 mm≈0.9$d_t$) and suspension viscosity (η=100 Pa·s). The maximum shear rate at the suspension-table interface decreased 100 s$^{-1}$ as the tip diameter increased from 0.254 mm to 1.370 mm. Since the volume flow rate was directly proportional to the tip diameter, (i.e., $\dot{Q}$ $d_t^2$), the observed reduction in shear rate at the contact point likely results from the increase in contact area, where the flow was distributed over a larger area. However, this behavior may also be attributed to complicated flow behavior which results in flow acceleration and thus greater flow velocities.

Figure 4D:
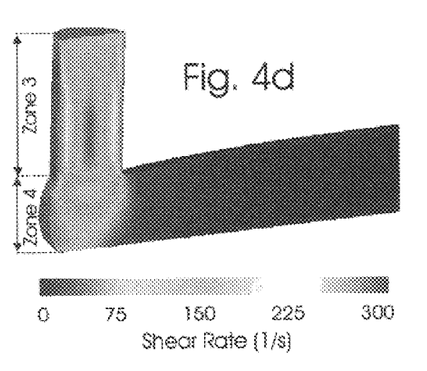

The impact of table speed ($s_t$) on shear rates during deposition are illustrated in FIGS. 4(d) and (a) for suspensions (η=100 Pa·s) cast at a constant tip diameter ($d_t$=0.254 mm), layer thickness ($t_l$=0.227 mm=0.9$d_t$), and volume flow rate ($\dot{Q}$=0.00025 ml/s) at table speeds ($s_t$) of 2.5 and 5.0 mm/s, respectively. The shear rate at the contact interface decreased with decreasing table speed, as evidenced by the maximum shear rate which increased by approximately 100 s$^{-1}$ when the table speed increased by a factor of two. Note, a decrease in table speed for a given volume flow rate ( $\dot{Q}$=0.00025 ml/s) led to the formation of a suspension bead that was larger than the outer tip diameter (indicative of excess flow).

The above calculations show that the processing conditions have a significant impact on the shear rate ranges expected during SFF fabrication, where the greatest shear rates occur during the mixing, extrusion and deposition processes. However, since the shear induced during deposition influences a relatively small volume of fluid, it is likely that its contribution is negligible relative to the mixing and extrusion zones. A comparison of the characteristic shear rates for these processes is provided in FIG. 2 for a table speed of 5 mm/s as used in the fabrication of SFF samples in this work. Note, the extrusion shear rate ($\dot{\gamma}_{ext}$) exceeds the average mixing shear rate in all cases, suggesting extrusion controlled deposition behavior when $\dot{\gamma}_{mix}$ is assigned its average value. However, as the mixing rate ($R_{mix}$) increases, the mixing shear rate ($\dot{\gamma}_{mix}$) exceeds the extrusion shear rate. This cross-over behavior occurs at a given mixing rate which depends on tip diameter. For example, at $d_t$=0.330 mm, the cross-over occurs at 100 rpm as the maximum mixing shear rate exceeds the extrusion shear rate. In the following sections, the influence of processing conditions and the corresponding shear rate conditions on suspension rheology and the resulting deposition behavior is discussed.

Rheological Behavior of Casting Suspensions

Figure 5:
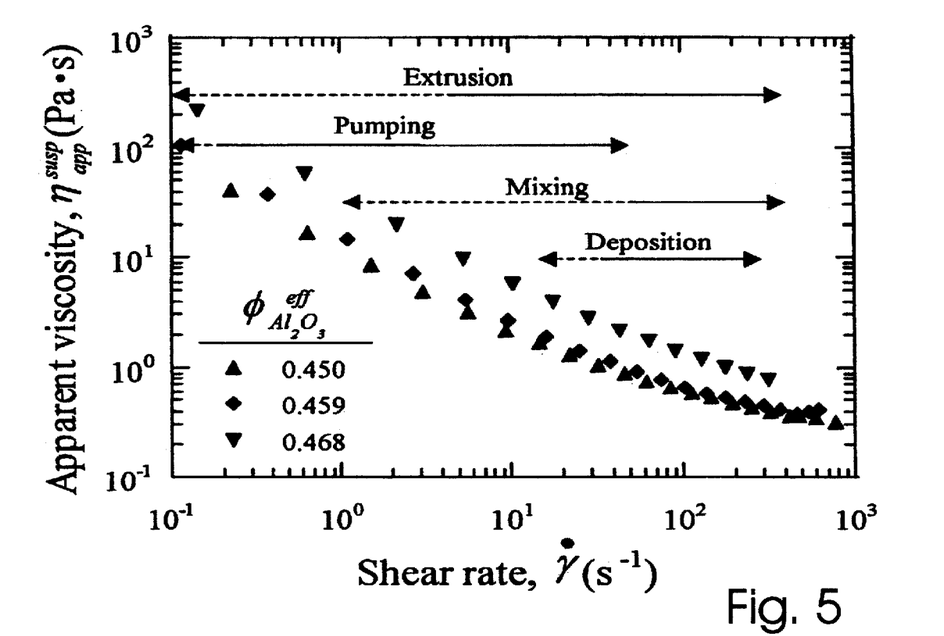
FIG. 5 shows apparent viscosity ($\eta_{app}$) as a function of shear rate ($\dot{\gamma}$) for representative casting suspensions with varying effective solids volume fractions ($\phi_{Al_2O_3}^{eff}$) prior to cross-linking agent addition.

The apparent suspension viscosity ($\eta_{app}^{susp}$) as a function of shear rate ($\dot{\gamma}$) for feedstock suspensions (i.e., suspensions without cross-linking agent addition) is shown in FIG. 5. All suspensions exhibited moderate shear-thinning behavior, where the apparent suspension viscosity ($\eta_{app}^{susp}$) decreased roughly two orders of magnitude over the process shear rate range denoted in FIG. 5. As expected, $\eta_{app}^{susp}$ increased with increasing effective solids volume fraction ($\phi_{Al_2O_3}^{eff}$). The estimated shear rate ranges for each step of the casting process are highlighted in FIG. 5, where the possible shear rate ranges are indicated by dashed lines and the actual process shear rates are represented by solid lines. Under typical deposition conditions, feedstock suspensions had apparent viscosities ($\eta_{app}^{susp}$) ranging from 0.1 to 100 Pa·s.

Effects of Processing Parameters on Deposition Behavior

Continuous printing was achieved at tip diameters of $d_t$=0.254–1.370 mm for all mixing rates ($R_{mix}$=5–300 rpm) and suspension compositions (i.e., $\phi_{Al_2O_3}$=0.45, $\phi_{PVA}$=0.275, [Ti]=0–6.30×10$^{-3}$ g Ti/ml) probed. The minimum tip diameter for continuous printing was 0.203 mm. Constant flow from the nozzle was achieved at smaller tip diameters (i.e., 0.102 mm), however, drying at the tip prevented uninterrupted printing.

Figures 6, 7A, 7B:
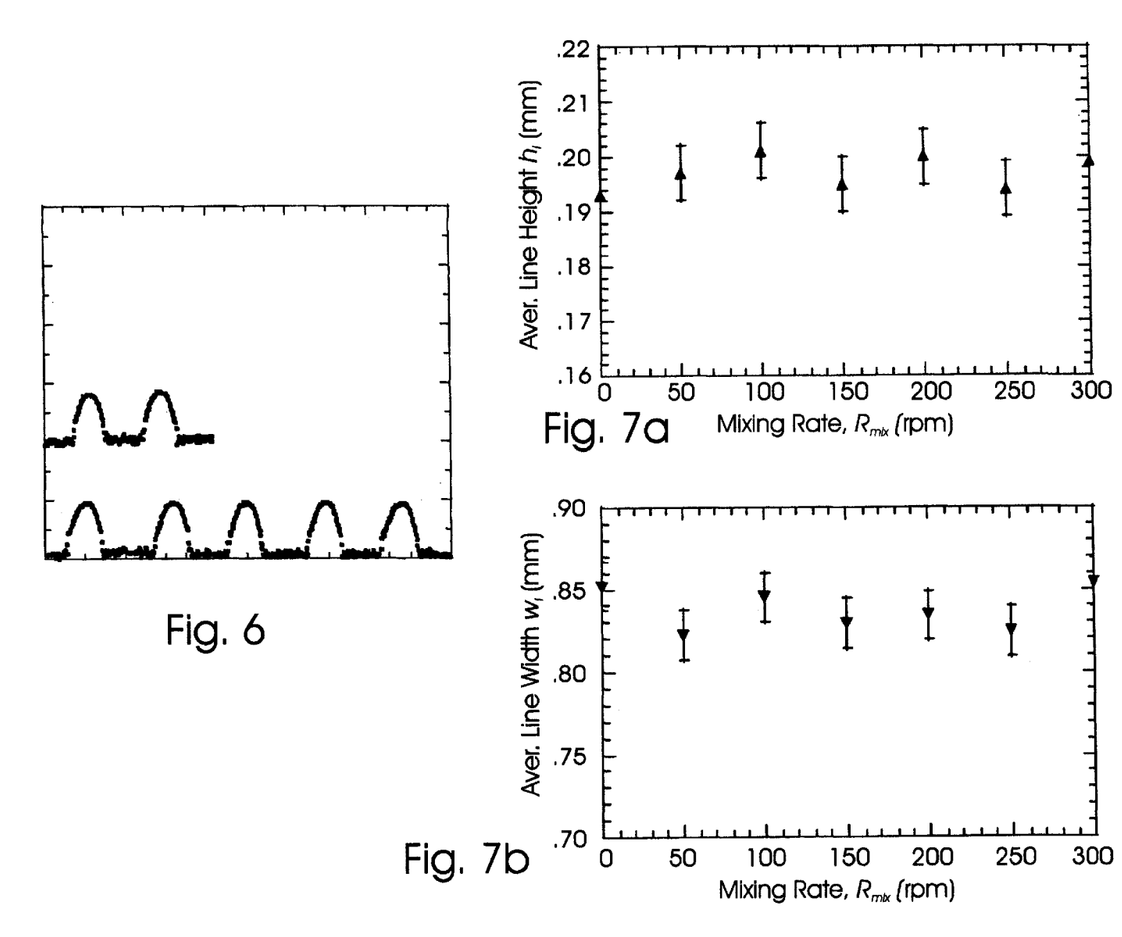
FIG. 6 shows laser profilometry scans for lines cast printed at a constant tip diameter.
FIGS. 7a and 7b show average line (a) height ($h_l$) and (b) width ($w_l$) as a function of mixing rate for dried lines cast from feedstock suspensions at varying mixing rates.

Printed lines were uniform with good edge definition for all deposition conditions. Laser profilometry scans of dried lines printed at varying mixing rate ($R_{mix}$) are shown in FIG. 6 where line height ($h_l$) is plotted as a function of cross-sectional distance (X) for a representative feedstock suspension ($\phi_{Al_2O_3}$=0.45, $\phi_{PVA}$=0.275, [Ti]=3.041×10$^{-3}$ g Ti/ml) printed at a constant tip diameter ($d_t$=0.33 mm) and at varying mixing rates ($R_{mix}$=0–300 rpm). Interestingly, the mixing rate did not have a significant effect on the line uniformity or on the line dimensions, (i.e., average line height ($h_l$) and width ($w_l$)), as illustrated in FIGS. 7(a) and (b), where the average dried line height ($h_l$) and width ($w_l$) are plotted as a function of mixing rate ($R_{mix}$), respectively. Such behavior is expected when the extrusion shear rate ($\dot{\gamma}_{ext}$) exceeds the mixing shear rate ($\dot{\gamma}_{mix}$). This condition is only observed when the mixing shear rate equals its average value or lower (refer to FIG. 2). The average dried line width, $w_l$=0.84±0.02 mm, was approximately 1.3 times the outer diameter of the tip ($d_t^{OD}$=0.64 mm) and the average dried line height, $h_l$=0.20±0.01 mm, was approximately 82% of the initial layer thickness ($l_t$=0.245 mm). Note, the expanded line widths observed may result either from spreading of the suspension after deposition given its shear thinning behavior or over-pumping of the suspension. where the suspension bead exceeds the tip edge (refer to FIG. 4(d)).

Properties of As-cast SFF Derived Components
Density of As-cast SPF Bodies

Figure 8A:
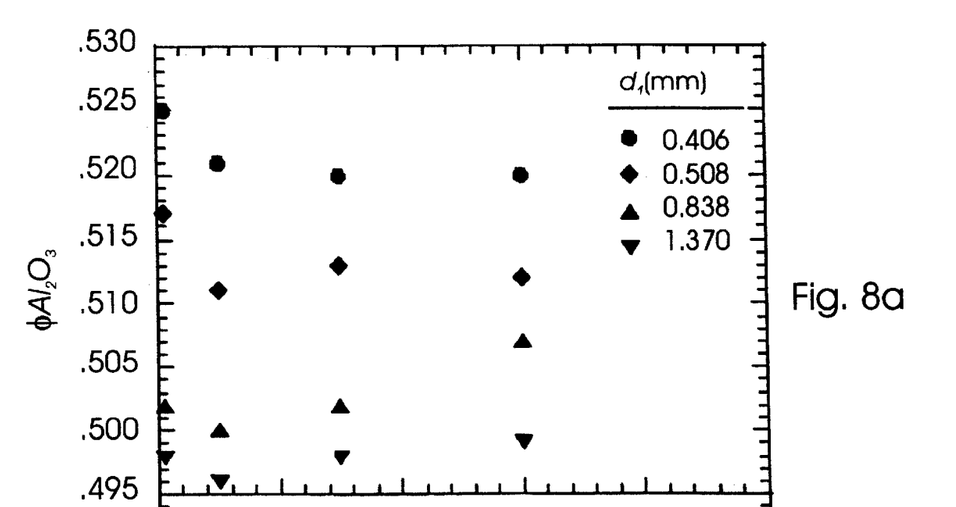
FIGS. 8a and 8b show solids volume fraction ($\phi_{Al_2O_3}$) as a function of mixing rate ($R_{mix}$) and tip diameter ($d_t$) for as-cast components fabricated from suspensions with varying cross-linking agent concentration.
Figure 8B:
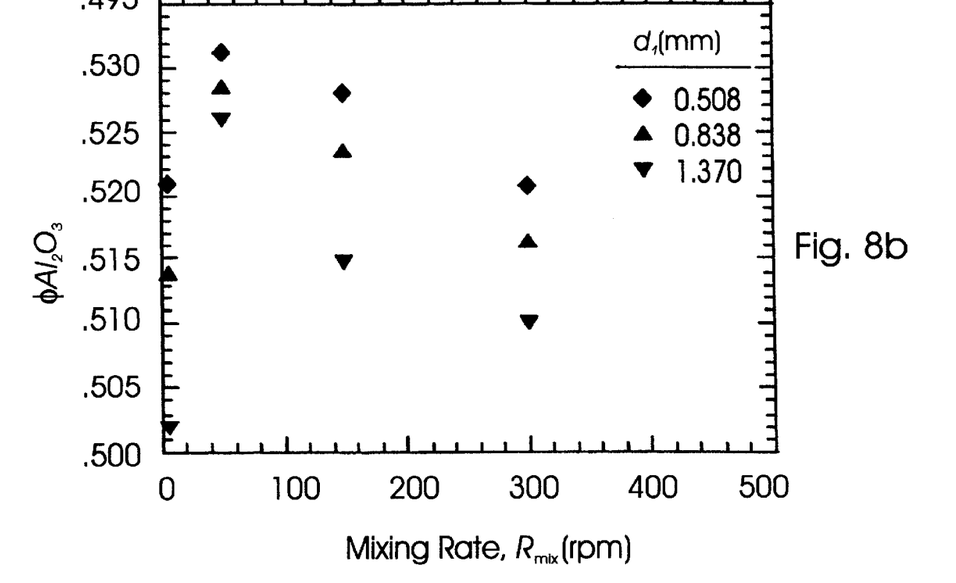

The alumina volume fraction ($\phi_{Al_2O_3}$) of as-cast SSF derived components fabricated at varying mixing rate ($R_{mix}$) and tip diameter ($d_t$) are shown in FIGS. 8(a) and (b) for [Ti]=0.0 g Ti/ml solution and 6.30×10$^{-3}$ g Ti/ml solution, respectively. The alumina volume fraction ($\phi_{Al_2O_3}$) of all gelcasting formulations exhibited a tip diameter dependence, where $\phi_{Al_2O_3}$ increased with decreasing tip diameter ($d_t$). These results were expected at low mixing rate (i.e., $R_{mix}$<25 rpm) since this processing regime was extrusion controlled, i.e., the extrusion shear rate ($\dot{\gamma}_{ext}$) exceeded the mixing shear rate ($\dot{\gamma}_{mix}$) for all tip diameters. In this regime, $\dot{\gamma}_{ext}$ increased with decreasing tip diameter, resulting in lower suspension viscosity and improved particle packing. Interestingly, tip diameter effects were also observed at higher mixing shear rates, suggesting that the extrusion shear rate exceeds the mixing shear rate for all processing conditions (i.e., the mixing shear rate is equal to or less than its average value). Alternatively, if $\dot{\gamma}_{mix}$ is greater than its average value, the origin of this trend is unclear.

Samples cast from suspensions containing 6.30×10$^{-3}$ g Ti/ml showed a moderate dependence on mixing rate ($R_{mix}$), where $\phi_{Al_2O_3}$ decreased with increasing mixing rate for $R_{mix}$>50 rpm for all tip diameters. While the origin of this in unclear, only slight variations in solids volume fraction were observed. The alumina volume fraction of SFF derived components was comparable to SFF samples devoid of cross-linking agent additions, as well as bulk cast samples with (0.0 g Ti/ml solution, $\phi_{Al_2O_3}$=0.501) and without (3.04×10$^{-3}$ g Ti/ml, $\phi_{Al_2O_3}$=0.524) crosslinker additions. Note, the $\phi_{Al_2O_3}$ for gelled samples was consistently higher than those without cross-linking agent additions. Recent work on the drying behavior of related bulk gelcast components suggests that a contraction of the gel network during drying is responsible for the observed trends in particle packing density.

As-cast Microstructures

Scanning electron photomicrographs were made showing cross-sections of as-cast bulk and SFF components cast from suspension containing 0.0 Ti/g solution and SFF-derived components cast at mixing rates of 5 rpm and 300 rpm from suspensions containing 6.30×10$^{-3}$ g Ti/ml solution. A constant tip diameter of 0.508 mm was used for fabrication of these SFF samples. No microstructural differences were detected between bulk and SFF-derived components, or SFF components formed in the absence of cross-linking agent additions. In all cases, particle packing was fairly uniform with no observable mixing rate effects. These results are reasonably consistent with measured solids volume fraction data described in the previous section, as only minimal variations in solids volume fraction with composition and mixing rate were observed for these samples. Note; no discernable microdefects (i.e., bubbles or cracking) were observed in either bulk or SFF-derived components.

Layer and Wall Uniformity

Optical and scanning electron images of a representative free-formed component cast at a mixing rate of 100 rpm with a tip diameter of 0.33 mm from a suspension ($\phi_{Al_2O_3}$=0.45, $\phi_{PVA}^{soln}$=0.05) containing [Ti]=3.041×10$^{-3}$ g Ti/ml show uniform layer thickness, where the average individual layer thickness measured 0.20±0.02 mm. Typical as-cast components had aspect ratios of greater than 7 and exhibited very little slumping. Note, over-pumping occurs during cornering resulting in widening of the component walls in these regions. Minimal stair casing effects were observed for average wall thicknesses of 0.43±0.01 mm.

CONCLUSION

The aforementioned results show the operation of the components of the invention over many conditions. It is a routine matter for one of ordinary skill in the art to determine the best parameters for a particular system using the materials under test. For example, with this material a system could easily be implemented that deposits a larger bead of material.

Other modifications are contemplated in the practice of this invention. Many powders, including metals, ceramics, and organics, may be used in place of the Al$_2$O$_3$ disclosed in the preferred embodiment. Also, any first and second fluid may be utilized that operate in the manner of an epoxy and hardener, where both fluids act as fluids until they mix to form a third fluid that quickly gels. It is also contemplated that the invention may use more than two fluids, either because more than two fluids are required for gelling, or because such an arrangement allows the seamless transition from one material to another material during fabrication.

In addition to the materials disclosed above, this invention may also be used with colloid-filled hydrogels, pure hydrogels, and hydrogel materials used as encapsulants for biological species (e.g., proteins, DNA, etc) which could also be selectively deposited at a given position via this robotically controlled deposition process.

While the preferred embodiment utilized syringes to store and move the first and second fluids, any equivalent device such as a feed-screw or pump may be utilized in the practice of the invention. However, the shearing effects of such other devices would have to be considered in the design of the fluids.

It is intended that the scope of the invention be defined by the claims appended hereto.

We claim:

1. A method for freeform fabrication of an object comprising:
   providing a first fluid in a first container;
   providing a second fluid in a second container;
   feeding said first and second fluids to opposing sides of a cylindrical mixing chamber, said mixing chamber further including an output at one end of the cylinder and a rotating paddle within the chamber for mixing the fluids;
   mixing said first and second fluids in said mixing chamber to form a third fluid; and depositing a bead of said third fluid from said mixing chamber onto a platform that moves relative to said mixing chamber to form an object, said third fluid gelling shortly after being deposited.

2. The method of claim 1 wherein the first and second containers are syringes, each syringe having an output, connected to a separate input of the mixing chamber.

3. A method for freeform fabrication of an object comprising:

providing a first fluid in a first syringe and a second fluid in a second syringe;

cooling each of the syringes to keep the first and second fluids from solidifying feeding said first and second fluids, respectively, to separate first and second inputs of a mixing chamber;

mixing said first and second fluids in said mixing chamber to form a third fluid; and depositing a bead of said third fluid from said mixing chamber onto a platform that moves relative to said mixing chamber to form an object, said third fluid gelling shortly after being deposited.

4. The method of claim 3 further comprising heating the platform to enhance the solidification of the third fluid, whereby the third fluid solidifies before the bead deforms significantly.

5. A method for freeform fabrication of an object comprising:

providing a first fluid in a first container, wherein said first fluid is an aqueous solution of a fine powder, a dispersant, and a polymeric additive;

providing a second fluid in a second container, wherein the second fluid is a cross-linking agent that reacts with the additive to form a gel;

feeding said first and second fluids to a mixing chamber;

mixing said first and second fluids in said mixing chamber to form a third fluid; and depositing a bead of said third fluid from said mixing chamber onto a platform that moves relative to said mixing chamber to form an object, said third fluid gelling shortly after being deposited.

6. The method of claim 5 wherein said fine powder is $Al_2O_3$, the dispersant is an aqueous solution of APMA, the polymeric additive is partially hydrolyzed PVA; and the cross-linking agent is a triethanolamine titanate chelate.

7. The method of claim 6, wherein said mixing chamber is a cylinder and the inputs are on opposing sides of the chamber, the mixing chamber further including an output at one end of the cylinder and a rotating paddle within the chamber for mixing the fluids.

8. The method of claim 7 further comprising heating the platform to enhance the solidification of the third fluid, whereby the third fluid solidifies before the bead deforms significantly.

9. The method of claim 5 wherein the first and second containers are syringes, each syringe having an output connected to a separate input of the mixing chamber.

10. The method of claim 9 further comprising cooling each of the syringes to keep the first and second fluids from solidifying.

* * * * *

UNITED STATES PATENT AND TRADEMARK OFFICE
CERTIFICATE OF CORRECTION

PATENT NO.    : 6,454,972 B1                                    Page 1 of 1
DATED         : February 12, 2002
INVENTOR(S)   : Sherry L. Morissette et al.

It is certified that error appears in the above-identified patent and that said Letters Patent is hereby corrected as shown below:

<u>Title page,</u>
Item [12], should read --    United States Patent

Morissette et al. --

Item [75], Inventors, 1st inventor should read -- Sherry L. Morissette, Belmont MA --

Signed and Sealed this

Twenty-first Day of January, 2003

JAMES E. ROGAN
*Director of the United States Patent and Trademark Office*